United States Patent
Lee et al.

[11] Patent Number: 5,877,813
[45] Date of Patent: Mar. 2, 1999

[54] LOOP FILTERING METHOD FOR REDUCING BLOCKING EFFECTS AND RINGING NOISE OF A MOTION-COMPENSATED IMAGE

[75] Inventors: Yung-Lyul Lee; Hyun-Wook Park, both of Seoul, Rep. of Korea

[73] Assignee: Samsung Electronics Co., Ltd., Kyungki-do, Rep. of Korea

[21] Appl. No.: 733,449

[22] Filed: Oct. 18, 1996

[30] Foreign Application Priority Data

Jul. 6, 1996 [KR] Rep. of Korea ............... 1996-27399

[51] Int. Cl.$^6$ ........................................ H04N 7/12
[52] U.S. Cl. ....................... 348/402; 348/404; 348/416
[58] Field of Search .................. 348/409, 404, 348/413, 416, 400, 402; 382/173, 199, 260, 265, 266, 233, 48; 358/465, 105; H04N 7/12

[56] References Cited

U.S. PATENT DOCUMENTS

| | | | |
|---|---|---|---|
| 5,027,422 | 6/1991 | Peregims et al. | 382/199 |
| 5,126,841 | 6/1992 | Tanaka et al. | 358/105 |
| 5,365,271 | 11/1994 | Asano | 348/402 |
| 5,367,385 | 11/1994 | Yuan | 358/465 |
| 5,461,422 | 10/1995 | Hsehi | 348/405 |
| 5,537,147 | 7/1996 | Tahara | 348/402 |
| 5,694,489 | 12/1997 | Kishi | 382/233 |

*Primary Examiner*—Bryan Tung
*Assistant Examiner*—Tung Vo
*Attorney, Agent, or Firm*—Sughrue, Mion, Zinn, Macpeak & Seas, PLLC

[57] ABSTRACT

A signal adaptive loop filter reduces blocking effects and ringing noise of motion-compensated image data. In the loop filter, binary edge map information on which global thresholding and local thresholding with respect to the motion-compensated image are reflected, is used to judge whether the binary edge map information within a predetermined size of the filter window is either a homogeneous or an edge area. If it is judged as a homogeneous area, predetermined first weight factors corresponding thereto are used for generating a filtered pixel value for the corresponding filter window. While, in the case that it is judged as an edge area, predetermined second weight factors are varied according to the binary edge map information corresponding to pixels, and the filter window having the varied second weight factors is used for generating the filtered pixel value corresponding to respective pixels.

11 Claims, 4 Drawing Sheets

FIG. 4A

| 1 | 2 | 3 |
|---|---|---|
| 4 | 5 | 6 |
| 7 | 8 | 9 |

FIG. 4B

| 1 | 1 | 1 |
|---|---|---|
| 1 | 1 | 1 |
| 1 | 1 | 1 |

FIG. 4C

| 1 | 1 | 1 |
|---|---|---|
| 1 | 3 | 1 |
| 1 | 1 | 1 | ent apparatus
LOOP FILTERING METHOD FOR REDUCING BLOCKING EFFECTS AND RINGING NOISE OF A MOTION-COMPENSATED IMAGE

BACKGROUND OF THE INVENTION

The present invention relates to a loop filtering method capable of reducing blocking effects and ringing noise, and more particularly, to a loop filtering method capable of reducing blocking effects and ringing noise of a motion-compensated image.

Most picture coding standards including H.263 of the International Telecommunication Union (ITU) and MPEG-1 and MPEG-2 of the International Standards Organization (ISO), use block-based processing for motion estimation and discrete cosine transform (DCT).

This block-based processing induces the well-known blocking effects and a ringing noise, particularly when an image is highly compressed. The blocking effects casue a viewer who views a decompressed image displayed on a screen to see the boundary between the blocks. The typical blocking effects are grid noise in the monotone area and staircase noise along the image edges. The ringing noise induces sinusoidal traces on the practical edges of an image.

SUMMARY OF THE INVENTION

To solve the above problem, it is an object of the present invention to provide a loop filtering method capable of largely reducing blocking effects and ringing noise, by adaptively filtering motion-compensated image data stored in a video memo 24 of encoding and decoding systems.

To accomplish the above object of the present invention, there is provided a signal adaptive loop filtering method of largely reducing blocking effects and ringing noise, comprising the steps of:

(a) generating binary edge map information by globally thresholding and locally thresholding the motion-compressed image;

(b) judging whether the binary edge map information within a filter window corresponding to respective pixels is either homogeneous area or edge area, by using the binary edge map information belonging to a predetermined size of the filter window;

(c) generating a filtered pixel value corresponding to a respective pixel using the filter window which has a predetermined first weight factors related to the homogeneous area, when the binary edge map information corresponding to the respective pixel is judged as the homogeneous area in said step (b);

(d) altering predetermined second weight factors according to the binary edge map information corresponding to the respective pixel when the binary edge map information is judged as the edge area in said step (b); and (e) generating a filtered pixel value corresponding to the respective pixel, using the filter window which has the altered second weight factors in said step (d).

BRIEF DESCRIPTION OF THE DRAWINGS

The preferred embodiments are described with reference to the drawings wherein:

FIG. 4A shows a filter window for a 3×3 filter proposed in the present invention, FIG. 4B shows weight factors for a 3×3 average filter, and FIG. 4C shows weight factors for a 3×3 weighted filter.

DETAILED DESCRIPTION OF THE PREFERRED EMBODIMENT

A preferred embodiment of the present invention will be described below in more detail with reference to the accompanying drawings.

Figure 1:
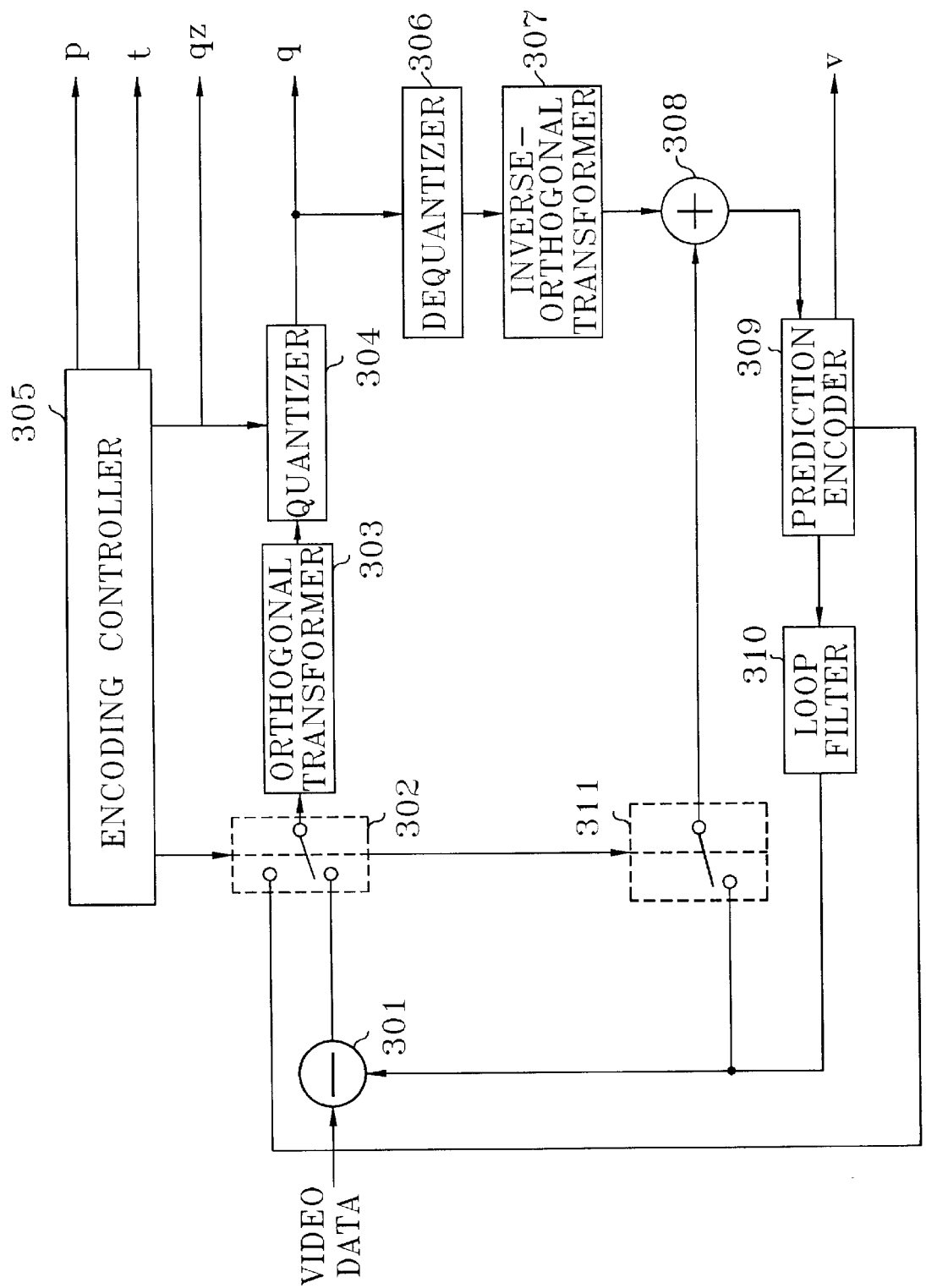
FIG. 1 is a block diagram showing an encoding apparatus employing a loop filter according to a preferred embodiment of the present invention.

FIG. 1 is a block diagram showing an encoding apparatus employing a loop filter according to a preferred embodiment of the present invention, which shows an encoding apparatus related to standard H.263. The operations of the blocks of the FIG. 1 apparatus are known to those skilled in the art, with the exception of the block depicting the loop filter 310. Therefore, the operations of those blocks which are widely known will be described only briefly.

Referring to FIG. 1, an input video signal is input to a subtracter 301, a first switch 302 and a prediction encoder 309. The subtracter 301 subtracts a signal filtered by the loop filter 310 from the input video signal, and an output signal of the subtracter circuit 301 is applied to the first switch 302. The first switch 302 selects either the input video signal or the output signal of the subtracter 301 according to the control of an encoding controller 305, and the selected signal is applied to an orthogonal transformer 303. The encoding controller 305 controls the first switch 302 so that the input video signal is applied to the orthogonal transformer 303 in the case of an intra coding mode, and the output signal of the subtracter 301 is applied to the orthogonal transformer 303 in the case of an inter coding mode. A signal passing through the orthogonal transformer 303 and a quantizer 304 is applied to a video multiplexer encoder (not shown) and a dequantizer 306. The dequantizer 306 dequantizes the applied signal, and the dequantized signal is supplied to an inverse-orthogonal transformer 307. An adder 308 adds an output signal of a second switch 311 and that of the supplied to the prediction encoder 309. The prediction encoder 309 performs a motion estimation and compensation using the input video signal and a video signal stored in an internal memory, and the resultant signal is stored in the internal memory. The prediction encoder 309 also outputs motion vector V, which is obtained by the motion estimation operation, to the video multiplexer encoder. The loop filter 310 according to the present invention performs filtering with regard to the picture stored in the prediction encoder 309, as will be described below. An output signal of the loop filter 310 is supplied to the subtracter 301 and the second switch 311. The second switch 311, which is controlled by the encoding controller 305, cuts off the input signal supplied to the adder 308 in the case of the intra coding mode, and supplies the input signal to the adder 308 in the case of the inter coding mode. The encoding controller 305 controls the above operation of the FIG. 1 apparatus, generates a flag P representing intra/inter modes, a quantizer indicator signal qz and a flag t representing whether or not a signal is transmitted.

Figure 2:
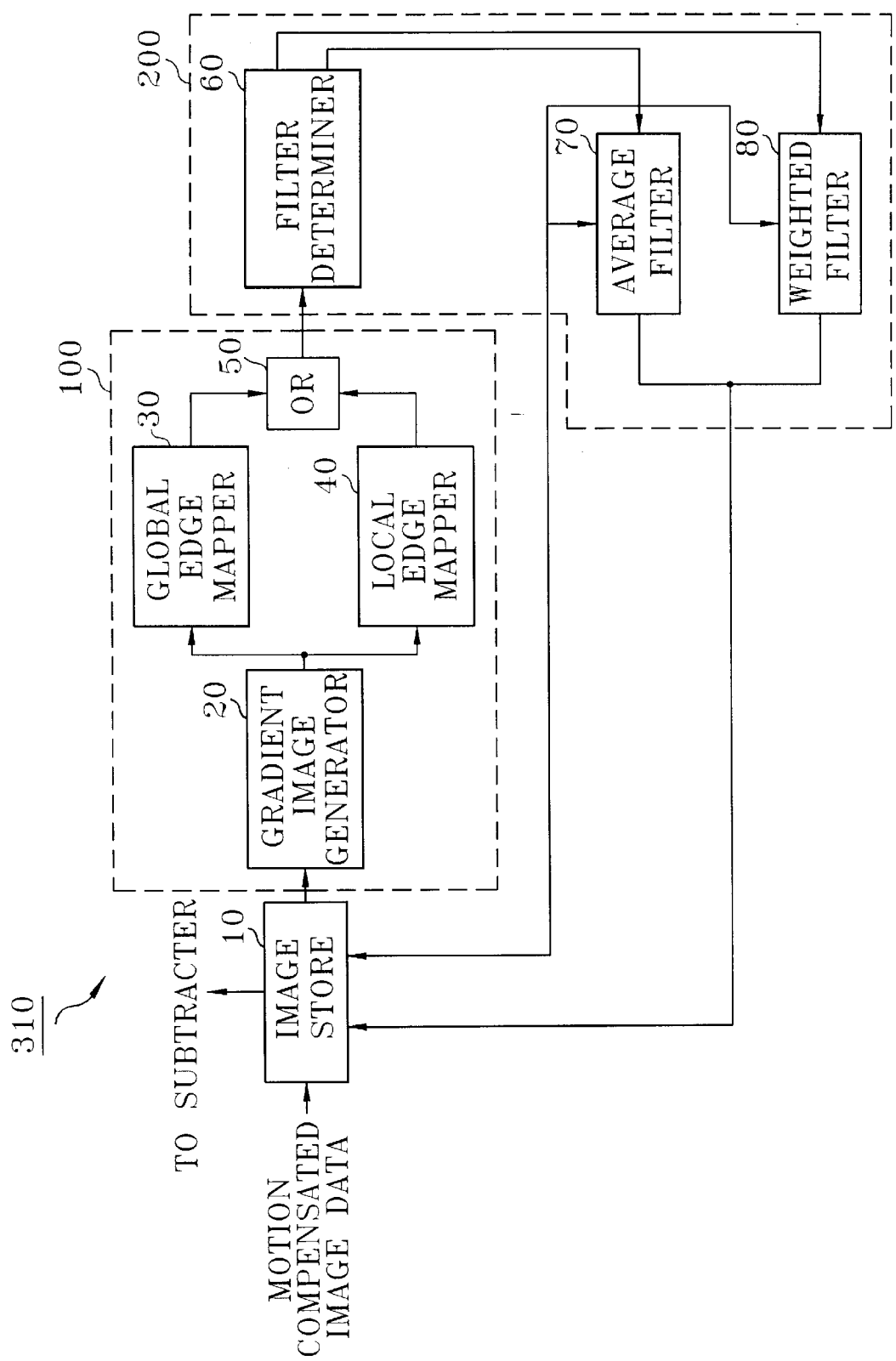
FIG. 2 is a block diagram illustrating a loop filter according to a preferred embodiment of the present invention.

FIG. 2 is a block diagram showing the loop filter 310 of the FIG.1 apparatus. The loop filter 310 of FIG. 2 includes an image store 10, an binary edge mapping unit 100 and a signal adaptive filter portion 200. The image store 10 stores data supplied from the prediction encoder 309 in which the motion estimation and compensation encoding are performed. The binary edge mapping unit 100 includes a gradient image generator 20, a global edge mapper 30, a local edge mapper 40 and a logical OR unit 50, which generates binary edge map information on which global edges and local edges of a motion-compensated image are reflected. The signal adaptive filter portion 200 includes a filter determiner 60, an average filter 70 and a weighted filter 80, which filters the motion-compensated image data using one of the average filter and the weighted filter to be described below based on the binary edge map information. The grid noise and the ringing noise are mitigated in the signal adaptive filter portion 200.

The gradient image generator 20 generates gradient image data using the image data stored in the image store 10. The gradient image generator 20 applies a vertical Sobel gradient operator and a horizontal Sobel gradient operator to the motion-compensated image, that is, the image data stored in the image store 10, so as to generate a gradient image. The gradient image data obtained by the gradient image generator 20 is supplied to the global edge mapper 30 and the local edge mapper 40.

The global edge mapper 30 produces a global edge map with respect to the whole image, and the local edge mapper 40 divides the whole image into blocks having a predetermined magnitude and produces a local edge map with respect to each of blocks. In more detail, the global edge mapper 20 calculates an edge value (i, j) corresponding to each pixel using the following equation (1).

If $|\nabla_h|+|\nabla_v| \geq T_g$, edge(i, j)=1

Otherwise, edge(i, j)=0 (1)

Here, $\nabla_h$ and $\nabla_v$ represent a horizontal gradient image and a vertical gradient image at a location (i, j) obtained by the horizontal Sobel gradient operator and the vertical Sobel gradient operator, respectively. $|\nabla_h|+|\nabla_v|$ represents a gradient value at a location (i, j), and $T_g$ is a global threshold value which is "100" when each pixel within an image has 256 grey levels.

Therefore, if a gradient value corresponding to a pixel of the location (i, j) is larger than or equal to the global threshold value $T_g$ the global edge mapper 30 determines an edge value corresponding to the pixel as "1". On the other hand, if a gradient value corresponding to a pixel is smaller than the global threshold value $T_g$, the global edge mapper 30 determines an edge value (i, j) corresponding to the pixel as "0". The global edge map information obtained by applying the above equation to the whole image is supplied to the logical OR unit 50.

The local edge mapper 40 produces a local edge map using the output of the gradient image generator 20. The local edge mapper 40 calculates a local threshold value with respect to each of all $M_1 \times M_2$ blocks of the gradient image, and calculates local edge values with respect to all gradient values contained in corresponding blocks using the calculated local threshold value. The block-based processing techniques, such as DCT transform and quantization, process signals with respect to an 8×8 block containing basically 8×8 pixels. Thus, the local edge mapper 40 according to the one embodiment of the present invention is also designed to draw a local edge map by using an 8×8 block. However, it will be apparent to a person skilled in the art that the present invention is not limited to the block of such a size.

The local threshold value $T_n$ with respect to an n-th 8×8 block in the gradient image is defined by the following equations (2)–(4).

$$T_n = \left| 1 - \frac{\sigma_n}{m_n} \right| \times T_g \quad (2)$$

$$\text{wherein, } \sigma_n = \sqrt{\frac{1}{N} \sum_{(i,j) \in R_n} \{g(i,j) - m_n\}^2} \quad (3)$$

$$m_n = \frac{1}{n} \sum_{(i,j) \in R_n} g(i,j) \quad (4)$$

Here, g(i, j) represents a gradient value, $R_n$ represents an n-th 8×8 block region, $m_n$ and $\sigma_n$ represent a mean value and a standard deviation of an n-th 8×8 block of the gradient image, respectively. $T_g$ represents a global threshold value and N is 64 in the case of an 8×8 block. If the n-th 8×8 block is homogeneous, a ratio $\sigma_n/m_n$ tends to be "0", with the result that $T_n$ becomes very close to $T_g$. Meanwhile, if the n-th 8×8 block is part of a complicated image, the ratio $\sigma_n/m_n$ increases. As a result, $T_n$ becomes smaller than $T_g$. This small $T_n$ is used in drawing a detail edge map which is not classified as a global edge by $T_g$.

The local edge mapper 40 individually compares the local threshold value $T_n$ with respect to the n-th 8×8 block with a part of the gradient values within the block, in magnitude. Here, the part of the gradient values corresponds to 6×6 pixels within the 8×8 block excluding the boundary pixels within the 8×8 block. If the gradient value used for drawing the local edge map is defined as described above, the detailed information is protected from blurring, and the grid noise is prevented from being detected as an image edge. If each gradient value being allowable within the n-th 8×8 block region $R_n$ is larger than or equal to the local threshold value $T_n$, the local edge mapper 40 determines a local edge value corresponding to the gradient value as "1". Meanwhile, if a gradient value corresponding to a pixel is smaller than the local threshold value $T_n$, the local edge mapper 40 determines a local edge value corresponding to the gradient value as "0". The local edge mapper 40 generates local edge map information by performing the operation procedure including an 8×8 block division, local edge value calculation and calculation of a local edge value using allowable gradient values of each block, with respect to all gradient values generated by the gradient image generator 20. The generated local edge map information is supplied to the logical OR unit 50.

Figure 3:
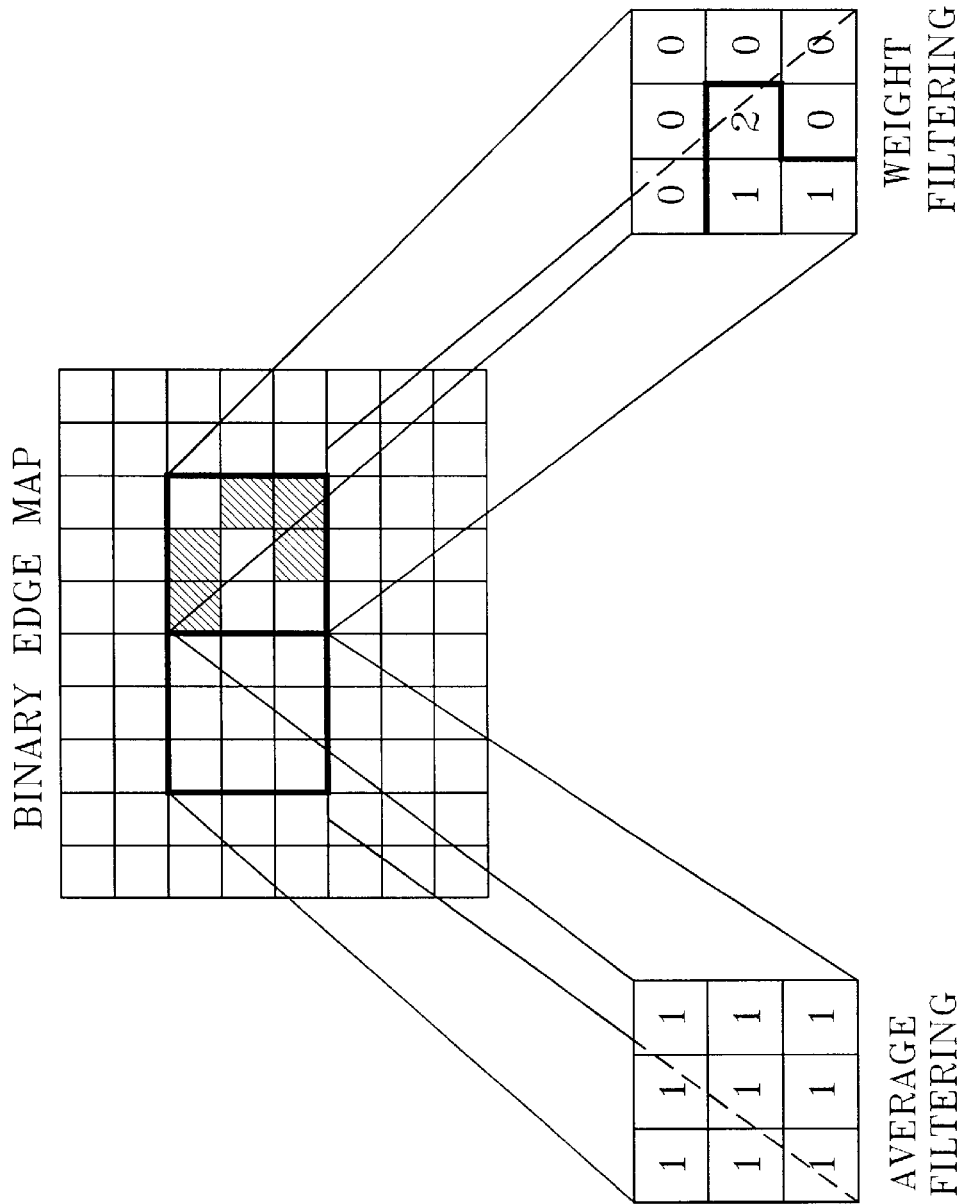
FIG. 3 is a conceptual view showing a binary edge map produced in a binary edge mapper of FIG. 2.

The logical OR unit 50 performs a logical OR operation of the global edge map information and the local edge map information which are related to each other with respect to a pixel location. The logical OR unit 50 performs a logical OR operation with respect to all global edge values on the global edge map and all local edge values on the local edge map, and outputs binary edge map information representing the result to the filter determiner 60. The binary edge map produced by the logical OR unit 50 is conceptually shown in FIG. 3. On the binary edge map of FIG. 3, the shaded squares represent the edge points, each of which has the edge value "1".

The filter determiner 60 stores the binary edge map information supplied from the logical OR unit 50. The motion compensated image is classified into two areas such as an edge area and a homogeneous area by a binary edge map. For this classification, the present invention uses the filter determiner 60. The average filter 70 and the weighted filter 80 described later use a 3×3 filter window. Thus a filter window used in the filter determiner 60 has a 3×3 size, too.

The filter determiner 60 judges whether a region on the binary edge map where the filter window is located is an edge area or a homogeneous area, based on the edge values contained in the filter window having a predetermined size, that is, the 3×3 size. If it is judged as a homogeneous area, the filter determiner 60 outputs position data with respect to the central point in the filter window used for judgement, to the average filter 70. In the case that it is judged as an edge area, the filter determiner 60 outputs the binary edge map information and position data with respect to the central point in the filter window used for judgement, to the weighted filter 80. Here, the central point represents a point where the pixel value located at the point is replaced with a new value by filtering.

FIGS. 4A–4C relate to a two-dimensional 3×3 filter. FIG. 4A shows a filter window for a 3×3 filter, FIG. 4B shows the weight factors for the 3×3 average filter, and FIG. 4C shows the weight factors for the 3×3 weighted filter. It is allowable for the weight factor of the central point shown in FIG. 4C to be replaced by 2. In the filter window of FIG. 4A, the central point of the filter window is a point where an index value of the filter weight factor is "2".

The average filter 70 and the weighted filter 80 are types of two-dimensional low-pass filters, the operation of which will be described as follows.

If position data with respect to the central point is input, the average filter 70 reads the pixel values necessary to calculate the filtered pixel value of the central point from the image store 10. Then, the average filter 70 calculates the filtered pixel values using the read pixel values and the weight factors shown in FIG. 4B. The calculated filtered pixel value is used as an altered pixel value with respect to the central point. The weighted filter 80 performs a filtering operation based on the binary edge map information and the position data supplied from the filter determiner 60 with respect to the central point. The operation of the weighted filter 80 will be described below in more detail.

If the central point "5" of the filter window is an edge point, the weighted filter 80 does not perform a filtering operation for the central point. If the edge point or the edge points are positioned in the 3×3 filter window excluding the central point, the weighted filter 80 performs a filtering operation using the weight factors shown in FIG. 4C.

If any edges are on the points 2 and 6, 6 and 8, 4 and 8 or 2 and 4 in FIG. 4A, the weight factors of the edge pixel and the outer neighbor pixels are set to zero. The signal adaptive filtered image data obtained by the average filter 70 and the weighted filter 80 are supplied to the image store 10.

The image store 10 replaces a corresponding pixel value by using the image data supplied from the average filter 70 and the weighted filter 80. Accordingly, the image store 10 stores the signal adaptive filtered image data with respect to all pixels in the image applied from the prediction encoder 309. The image store 10 outputs image data to be used in the subtracter 301 and the adder 308 of FIG. 1.

Although the above embodiment illustrates the loop filtering with regard to an image output from a prediction encoder, it will be obvious to a person skilled in the art that a modification may be made to perform loop filtering with respect to the image stored in a frame memory of the prediction encoder.

Although the above embodiment is illustrated with reference to an encoder, it will be apparent to a person skilled in the art that the loop filter can be also used in motion-compensated image data of a decoding apparatus. Furthermore, a description relating to standard H.263 has been given for this embodiment, but verification model VM 2.1 of MPEG-4 can be used just as well.

As described, the loop filtering method according to the present invention reduces the blocking effects and the ringing noise from the motion-compensated image, thereby providing an effect of improving the quality of the decompressed image.

While only certain embodiments of the invention have been specifically described herein, it will apparent that numerous modifications may be made thereto without departing from the spirit and scope of the invention.

What is claimed is:

1. A signal adaptive loop filtering method for a motion-compensated image, said signal adaptive loop filtering method comprising the steps of:

(a) generating binary edge map information by globally thresholding and locally thresholding the motion-compensated image;

(b) judging whether the binary edge map information within a filter window corresponding to respective pixels is either homogeneous area or edge area, by using the binary edge map information associated with a predetermined size of the filter window;

(c) generating a filtered pixel value corresponding to a respective pixel using the filter window which has predetermined first weight factors related to the homogeneous area, when the binary edge map information corresponding to the respective pixel is judged as the homogeneous area in said step (b);

(d) altering predetermined second weight factors according to the binary edge map information corresponding to the respective pixel when the binary edge map information is judged as the edge area in said step (b); and (e) generating a filtered pixel value corresponding to the respective pixel, using the filter window which has the altered second weight factors in said step (d).

2. The signal adaptive filtering method according to claim 1, wherein said step (a) comprises the steps of:

(a1) generating a gradient image corresponding to the motion-compensated image;

(a2) generating global edge map information which is composed of first edge values corresponding to respective pixels of the motion-compensated image, by comparing a predetermined first thresholding value with a gradient value corresponding to the respective first pixels within the gradient image;

(a3) generating local edge map information which is composed of second edge values corresponding to respective second pixels of the motion-compensated image, by comparing gradient values within a predetermined size of individual blocks into which the motion-compensated image is divided, with a predetermined second thresholding value corresponding to a respective one of the individual blocks; and (a4) logically summing one of the first edge values in the global edge map information and a corresponding one of the second edge values in the local edge map information, and generating binary edge map information.

3. The signal adaptive filtering method according to claim 2, wherein the second thresholding value of step (a3) is calculated corresponding to respective blocks using the following equation:

$$T_n = \left| 1 - \frac{\sigma_n}{m_n} \right| \times T_g$$

$$\text{wherein, } \sigma_n = \sqrt{\frac{1}{N} \sum_{(i,j) \in R_n} \{g(i,j) - m_n\}^2}$$

$$m_n = \frac{1}{n} \sum_{(i,j) \in R_n} g(i,j)$$

Here, g(i, j) represents a respective gradient value, $R_n$ represents a n-th 8×8 block region, $m_n$, and $\sigma_n$ represent, respectively, a mean value and a standard deviation of an n-th 8×8 block of the gradient image, and $T_g$ represents a global threshold value.

4. The signal adaptive filtering method according to claim 3, wherein said step (a3) compares the gradient values corresponding to a 6×6 array of pixels within an 8×8 block excluding boundary pixels within the 8×8 block with the corresponding predetermined second thresholding value.

5. The signal adaptive loop filtering method according to claim 1, wherein values of the predetermined second weight factors decrease as the predetermined second weight factors move from the central point of the filter window to the boundary thereof.

6. The signal adaptive filtering method according to claim 5, wherein said filter window has a 3×3 size.

7. The signal adaptive filtering method according to claim 6, wherein the predetermined weight values of the filter window of said step c are equal in magnitude.

8. The signal adaptive filtering method according to claim 7, wherein the magnitude of said predetermined first weight factors is "1".

9. The signal adaptive filtering method according to claim 8, wherein the value of the second weight factor which corresponds to said central point is "2", and the values of the second weight factors which correspond to points other than said central point are "1".

10. The signal adaptive filtering method according to claim 8, wherein the value of the second weight factor which corresponds to said central point is "3", and the values of the second weight factors which correspond to points other than said central point are "1".

11. The signal adaptive filtering method according to claim 8, wherein said step (d) comprises the step of setting to zero the values of the second weight factors which correspond to positions along a diagonal line and setting to zero the values of the second weight factors which correspond to outer neighbor positions of the positions placed along the diagonal line, if the binary edge map information which corresponds to the positions along the diagonal lines among positions excluding the central point of the 3×3 sized filter window is represented as all edge points.

* * * * *